US010990941B1

(12) United States Patent
DeVan et al.

(10) Patent No.: US 10,990,941 B1
(45) Date of Patent: Apr. 27, 2021

(54) SYSTEMS AND METHODS FOR FACILITATING PAYMENTS

(71) Applicant: JPMorgan Chase Bank, N.A., New York, NY (US)

(72) Inventors: Stan DeVan, Mount Royal, NJ (US); Daniel Scott Poswolsky, Plainview, NY (US); Janice Mathews, New York, NY (US); Beverly Kennedy, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 882 days.

(21) Appl. No.: 14/699,511

(22) Filed: Apr. 29, 2015

Related U.S. Application Data (60) Provisional application No. 62/148,493, filed on Apr. 16, 2015, provisional application No. 62/107,800, filed on Jan. 26, 2015, provisional application No. 62/037,891, filed on Aug. 15, 2014.

(51) Int. Cl.
*G06Q 20/12* (2012.01)
*G06Q 20/36* (2012.01)
*G06Q 20/22* (2012.01)
*G06Q 20/40* (2012.01)

(52) U.S. Cl.
CPC .......... *G06Q 20/12* (2013.01); *G06Q 20/227* (2013.01); *G06Q 20/36* (2013.01); *G06Q 20/40* (2013.01)

(58) Field of Classification Search
CPC ........ G06Q 20/12; G06Q 20/36; G06Q 20/40; G06Q 20/227
See application file for complete search history.

(56) References Cited

U.S. PATENT DOCUMENTS

| | | | |
|---|---|---|---|
| 5,815,657 | A | 9/1998 | Williams et al. |
| 5,960,411 | A | 9/1999 | Hartman et al. |
| 5,963,924 | A | 10/1999 | Williams et al. |
| 6,061,665 | A | 5/2000 | Bahreman |
| 6,092,053 | A | 7/2000 | Boesch et al. |
| 6,615,226 | B1 | 9/2003 | Hartman et al. |

(Continued)

OTHER PUBLICATIONS

Nixon, R. "Recipe 77, Lightbox()." in: Web Developer's Cookbook: More Than 300 Ready Made PHP, JavaScript, and CSS Recipes, The McGraw Hill Companies, 2012. pp. 627-631. (Year: 2012).*

(Continued)

*Primary Examiner* — Mike Anderson
*Assistant Examiner* — Bolko M Hamerski
(74) *Attorney, Agent, or Firm* — Greenberg Traurig LLP (57) ABSTRACT

Systems and methods for facilitating payments are disclosed. In one embodiment, a method for facilitating a transaction may include (1) a customer selects a good or service to purchase from a merchant; (2) the customer being authenticated with a financial institution; and (3) the financial institution associating a unique identifier for the customer's merchant account with the customer's financial institution account. In another embodiment, a method for facilitating a transaction may include (1) a customer selecting a good or service to purchase from a merchant; (2) the customer being authenticated with a financial institution; (3) the financial institution provisioning a merchant-specific identifier for the merchant; and (4) the financial institution providing the merchant-specific token to the merchant.

18 Claims, 7 Drawing Sheets

(56) References Cited

U.S. PATENT DOCUMENTS

| | | |
|---|---|---|
| 6,629,135 B1 | 9/2003 | Ross, Jr. et al. |
| 7,047,041 B2 | 5/2006 | Vanska et al. |
| 7,107,078 B2 | 9/2006 | Lehto |
| 7,111,789 B2 | 9/2006 | Rajasekaran et al. |
| 7,146,341 B1 | 12/2006 | Light et al. |
| 7,155,411 B1 | 12/2006 | Blinn et al. |
| 7,159,180 B2 | 1/2007 | Ward |
| 7,222,087 B1 | 5/2007 | Bezos et al. |
| 7,225,464 B2 | 5/2007 | Satyavolu et al. |
| 7,343,351 B1 | 3/2008 | Bishop et al. |
| 7,346,587 B2 | 3/2008 | Goldstein et al. |
| 7,398,253 B1 | 7/2008 | Pinnell |
| 7,450,966 B2 | 11/2008 | Vanska et al. |
| 7,475,043 B2 | 1/2009 | Light et al. |
| 7,617,125 B1 | 11/2009 | Light et al. |
| 7,620,600 B2 | 11/2009 | Patil et al. |
| 7,693,796 B2 | 4/2010 | Light et al. |
| 7,708,194 B2 | 5/2010 | Vawter |
| 7,720,712 B1 | 5/2010 | Allocca et al. |
| 7,742,967 B1 | 6/2010 | Keresman, III et al. |
| 7,801,829 B2 | 9/2010 | Gray et al. |
| 7,877,299 B2 | 1/2011 | Bui |
| 7,930,249 B2 | 4/2011 | Roberts |
| 7,953,642 B2 | 5/2011 | Dierks |
| 7,966,259 B1 | 6/2011 | Bui |
| 8,028,041 B2 | 9/2011 | Olliphant et al. |
| 8,031,207 B2 | 10/2011 | Phillips |
| 8,121,945 B2 | 2/2012 | Rackley, III et al. |
| 8,145,718 B1 | 3/2012 | Kacker et al. |
| 8,150,767 B2 | 4/2012 | Wankmueller |
| 8,160,935 B2 | 4/2012 | Bui |
| 8,170,615 B2 | 5/2012 | Vanska et al. |
| 8,170,954 B2 | 5/2012 | Keresman, III et al. |
| 8,190,513 B2 | 5/2012 | Felger |
| 8,214,288 B2 | 7/2012 | Olliphant et al. |
| 8,214,291 B2 | 7/2012 | Pelegero et al. |
| 8,214,299 B2 | 7/2012 | Bishop et al. |
| 8,244,590 B2 | 8/2012 | Rothman |
| 8,244,641 B2 | 8/2012 | Light et al. |
| 8,266,001 B2 | 9/2012 | Dierks |
| 8,290,876 B1 | 10/2012 | Powell |
| 8,296,187 B2 | 10/2012 | Light et al. |
| 8,301,510 B2 | 10/2012 | Boesch |
| 8,352,370 B1 | 1/2013 | White |
| 8,359,005 B2 | 1/2013 | Smith et al. |
| 8,370,264 B1 | 2/2013 | Wei et al. |
| 8,370,265 B2 | 2/2013 | Coulter et al. |
| 8,423,462 B1 | 4/2013 | Amacker et al. |
| 8,423,474 B2 | 4/2013 | Light et al. |
| 8,467,766 B2 | 6/2013 | Rackley, III et al. |
| 8,489,067 B2 | 7/2013 | Rackley, III et al. |
| 8,498,940 B2 | 7/2013 | Pelegero et al. |
| 8,538,877 B2 | 9/2013 | Olliphant et al. |
| 8,571,937 B2 | 10/2013 | Rose et al. |
| 8,577,742 B2 | 11/2013 | Long et al. |
| 8,577,803 B2 | 11/2013 | Chatterjee et al. |
| 8,583,501 B2 | 11/2013 | Dierks |
| 8,589,237 B2 | 11/2013 | Fisher |
| 8,676,694 B2 | 3/2014 | Keresman, III et al. |
| 8,694,380 B2 | 4/2014 | Fisher |
| 8,700,472 B2 | 4/2014 | Gray |
| 8,812,396 B2 | 8/2014 | Alba et al. |
| 8,843,125 B2 | 9/2014 | Kwon et al. |
| 8,924,310 B2 | 12/2014 | Bishop et al. |
| 9,639,907 B2 | 5/2017 | Theobald |
| 9,679,284 B2 | 6/2017 | Andrews |
| 9,704,155 B2 | 7/2017 | McCullagh |
| 2002/0052853 A1* | 5/2002 | Munoz ................ G06Q 20/027 705/79 |
| 2006/0106680 A1 | 5/2006 | Shafron et al. |
| 2006/0166740 A1 | 7/2006 | Sufuentes |
| 2006/0235761 A1 | 10/2006 | Johnson |
| 2007/0288377 A1* | 12/2007 | Shaked ................ G06Q 20/04 705/44 |
| 2008/0040261 A1 | 2/2008 | Nix |
| 2008/0319914 A1* | 12/2008 | Carrott ............ G06Q 20/38215 705/75 |
| 2010/0114731 A1* | 5/2010 | Kingston ............... G06Q 20/10 705/26.1 |
| 2011/0010289 A1 | 1/2011 | Kranzley |
| 2011/0270714 A1 | 11/2011 | Myrick et al. |
| 2012/0150750 A1 | 6/2012 | Law |
| 2012/0304273 A1* | 11/2012 | Bailey .............. G06Q 20/38215 726/9 |
| 2012/0317036 A1 | 12/2012 | Bower |
| 2013/0046600 A1* | 2/2013 | Coppinger ......... G06Q 30/0236 705/14.23 |
| 2013/0185214 A1 | 7/2013 | Azen |
| 2013/0191227 A1 | 7/2013 | Pasa et al. |
| 2013/0198080 A1 | 8/2013 | Anderson |
| 2013/0254028 A1 | 9/2013 | Salci |
| 2013/0297504 A1 | 11/2013 | Nwokolo |
| 2013/0332344 A1 | 12/2013 | Weber |
| 2013/0346302 A1* | 12/2013 | Purves ................ G06Q 20/108 705/40 |
| 2014/0006276 A1 | 1/2014 | Grigg et al. |
| 2014/0040149 A1 | 2/2014 | Fiske |
| 2014/0074637 A1* | 3/2014 | Hammad ............ G06Q 20/227 705/21 |
| 2014/0074655 A1 | 3/2014 | Lim et al. |
| 2014/0081729 A1 | 3/2014 | Ocher |
| 2014/0081853 A1 | 3/2014 | Sanchez |
| 2014/0136353 A1 | 5/2014 | Goldman |
| 2014/0188704 A1 | 7/2014 | Grossman et al. |
| 2014/0188718 A1 | 7/2014 | Grossman et al. |
| 2014/0207680 A1 | 7/2014 | Rephlo |
| 2014/0278905 A1 | 9/2014 | DeNardis |
| 2015/0019333 A1 | 1/2015 | Low et al. |
| 2015/0019420 A1 | 1/2015 | Low et al. |
| 2015/0019421 A1 | 1/2015 | Low et al. |
| 2015/0032627 A1 | 1/2015 | Dill |
| 2015/0066765 A1* | 3/2015 | Banks .................... G06Q 40/02 705/44 |
| 2015/0161608 A1* | 6/2015 | Gilbert ............... G06Q 20/4014 705/44 |
| 2016/0048836 A1* | 2/2016 | Sabatier ................. G06Q 20/12 705/71 |
| 2016/0086147 A1 | 3/2016 | Schwarz |
| 2016/0110798 A1* | 4/2016 | Woo .................. G06Q 30/0633 705/26.8 |
| 2017/0249639 A9 | 8/2017 | Kranzley |
| 2017/0323299 A1 | 11/2017 | Davis |

OTHER PUBLICATIONS

R. Abdellaoui and M. Pasquet, "Secure Communication for Internet Payment in Heterogeneous Networks," 2010 24th IEEE International Conference on Advanced Information Networking and Applications, Perth, WA, 2010, pp. 1085-1092, doi: 10.1109/AINA.2010.45. (Year: 2010).*

* cited by examiner

SYSTEMS AND METHODS FOR FACILITATING PAYMENTS

RELATED APPLICATIONS

The present application claims priority to U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014. The disclosure of each of these documents is hereby incorporated, by reference, in its entirety.

BACKGROUND OF THE INVENTION

1. Field of the Invention

The present invention generally relates to payment processing, and, more specifically, to systems and methods for facilitating online payments.

2. Description of the Related Art

It is commonplace for customers to purchase items online. Typically, the customer will select an item and go to a "checkout screen" where the user then enters his or her credit card information, billing address, and shipping address. The merchant then provides this information to a financial institution to authorize the underlying transaction.

SUMMARY OF THE INVENTION

Systems and methods for facilitating payments are disclosed. In one embodiment, a method for facilitating a transaction may include (1) a financial institution establishing a session with a merchant; (2) at least one computer processor for the financial institution validating the merchant; (3) the at least one computer processor for the financial institution providing the merchant with a session identifier; (4) the at least one computer processor for the financial institution providing the merchant with a logon page for the customer; (5) the at least one computer processor for the financial institution receiving logon information from the customer; (6) the at least one computer processor for the financial institution validating the customer logon information; (7) the at least one computer processor for the financial institution retrieving an electronic wallet for the customer; (8) the at least one computer processor for the financial institution retrieving a shipping address for the customer; (9) the at least one computer processor for the financial institution receiving a payment request from the merchant, the payment request comprising a selection of an account from the electronic wallet and the session identifier; and (10) the at least one computer processor for the financial institution approving the payment request.

In one embodiment, the session identifier may include a session token.

In one embodiment, the logon page may be provided in a lightbox. In another embodiment, the logon page may be provided in a separate browser window.

In one embodiment, the logon page may be pre-populated with a customer identifier.

In one embodiment, the computer processor for the financial institution may receive the session identifier with the logon information from the customer.

In one embodiment, the computer processor for the financial institution may receive a device identifier prior to providing the logon page, and may identify at least one customer identifier to present to the customer on the logon page based on the device identifier.

In one embodiment, the merchant may receive an IP address of the customer.

In one embodiment, the computer processor for the financial institution may present at least one payment account in the electronic wallet to the customer as a payment option.

In one embodiment, the account may be a non-payment account. The non-payment account may be a line of credit, a mortgage, a rewards point account, etc.

In one embodiment, the account may be an application for an account.

In one embodiment, the computer processor for the financial institution pre-selects an account from the electronic wallet for the customer and presents the pre-selected account to the customer.

According to another embodiment, a method for facilitating a transaction may include (1) at least one computer processor for a financial institution authenticating a customer that has selected a good or service to purchase from a merchant; and (2) the at least one computer processor for the financial institution associating a unique identifier with an account that the customer has with the financial institution.

In one embodiment, the financial institution may receive the unique identifier from the merchant. In another embodiment, the financial institution may provide the unique identifier to the merchant.

In one embodiment, the step of the at least one computer processor for the financial institution authenticating a customer that has selected a good or service to purchase from a merchant may include the at least one computer processor for the financial institution receiving logon information from the customer. In one embodiment, the logon information may be received in a session between the merchant and the financial institution.

According to another embodiment, a method for facilitating a transaction may include (1) at least one computer processor for a financial institution authenticating a customer that has selected a good or service to purchase from a merchant; (2) the at least one computer processor for the financial institution provisioning a merchant-specific identifier for the merchant; and (3) the financial institution providing the merchant-specific identifier to the merchant.

In one embodiment, the merchant-specific identifier may include a merchant-specific token.

In one embodiment, the step of the at least one computer processor for the financial institution authenticating a customer that has selected a good or service to purchase from a merchant may include the at least one computer processor for the financial institution receiving logon information from the customer. In one embodiment, the logon information is received in a session between the merchant and the financial institution.

In one embodiment, the financial institution may provide a replacement merchant-specific identifier to merchant when the merchant-specific identifier changes.

According to another embodiment, a method for creating a customer account with a merchant may include (1) at least one computer processor for a merchant receiving a selection of a good or service to purchase from a customer; (2) the at least one computer processor for the merchant receiving a selection from the customer to pay with a financial institution; (3) the at least one computer processor for the merchant receiving customer contact information from the financial institution; and (4) the at least one computer processor for the merchant creating a customer account with the customer contact information provided by the financial institution.

In one embodiment, the method may include the computer processor for the merchant assigning a userid to the customer.

In another embodiment, the method may include the computer processor for the merchant receiving a selection of a userid from the customer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-7.

Embodiments disclosed herein facilitate on-line payments. In one embodiment, a financial institution (or any other suitable entity) may partner with a merchant, and may provide computer code, script, etc. that incorporates a special payment feature to the merchant's check-out screen. When the user selects this feature, the code initiates a session with the financial institution and also provides client and/or transaction information, for example, the client IP address, a merchant identifier, and a unique identifier that is associated with the transaction, to the financial institution. After a session is initiated, the financial institution may search for an identifier, such as a cookie, on the user's device to see if the device is registered with the financial institution. If the device is registered, the financial institution will retrieve the device ID based on the cookie.

In one embodiment, the code may open a separate window within the merchant's website (e.g., a JavaScript "Light Box" or other suitable interface), the user IDs that are associated with the device, or any user IDs that have been used on the device, may be presented to the user in a drop-down box. This may be to prevent or reduce phishing. The user may then select the proper user ID and then enter a password.

The user may then select the appropriate account and the shipping address from any shipping addresses that may be associated with the account. Alternatively, the user may use a "quick click" option by which the user's preferred account and preferred shipping address are used. For example, after the user is authenticated with the financial institution, the user is returned to the merchant checkout page with all fields pre-populated. In still another embodiment, after the user is authenticated with the financial institution, the transaction with the merchant is completed using the preferred account and shipping information.

In one embodiment, the customer may enable or disable this feature by, for example, checking a box, making a selection, etc. during the logon process. Thus, the user may have the option of using the "quick click" feature for each transaction, and does not need to change his or her preferences to do so.

On the back-end, the user may only be presented with accounts that are eligible for use. For example, only active accounts may be presented. This is in contrast with other payment facilitators that may not know whether a card is valid, cancelled, expired, etc. until an attempt to authorize the transaction is made. Since the financial institution controls the relationship, all payment information is known and is up-to-date. In addition, the customer does not need to provide any payment information to the merchant as all payment information is maintained by the financial institution.

In one embodiment, the wallet may be provided with payment information before the user receives the physical card. In one embodiment, the mobile application may be synchronized with the user's payment accounts, non-payment accounts, etc. For example, the user's mobile application may be thought of as an extension of the user's online accounts.

In one embodiment, the payment information may be automatically provisioned to the user's wallet and/or mobile application during account creation. An example of such is disclosed in U.S. patent application Ser. No. 14/081,164, filed Nov. 15, 2013, and U.S. Provisional Patent Application Ser. No. 61/835,784, filed Jun. 17, 2013. The disclosures of these documents is hereby incorporated, by reference, in their entireties.

Notably, the service may be provided on the financial institution's website, as a distributed service on a merchant's website, or in any other suitable manner.

Both the customer and the merchant may benefit from this system. From the customer's perspective, the system is secure (e.g., payment information is not shared with the merchant) and convenient. From the merchants' perspective, the convenience may lead to a decrease in drop-off at checkout (e.g., abandoned shopping carts), a simpler reconciliation process, enhanced reporting capability, and a reduction in chargeback as the merchant may not be liable for fraudulent purchases. Leveraging the relationship with the merchant, additional offers may be made to the customer via the merchant and/or the application.

Figure 1:
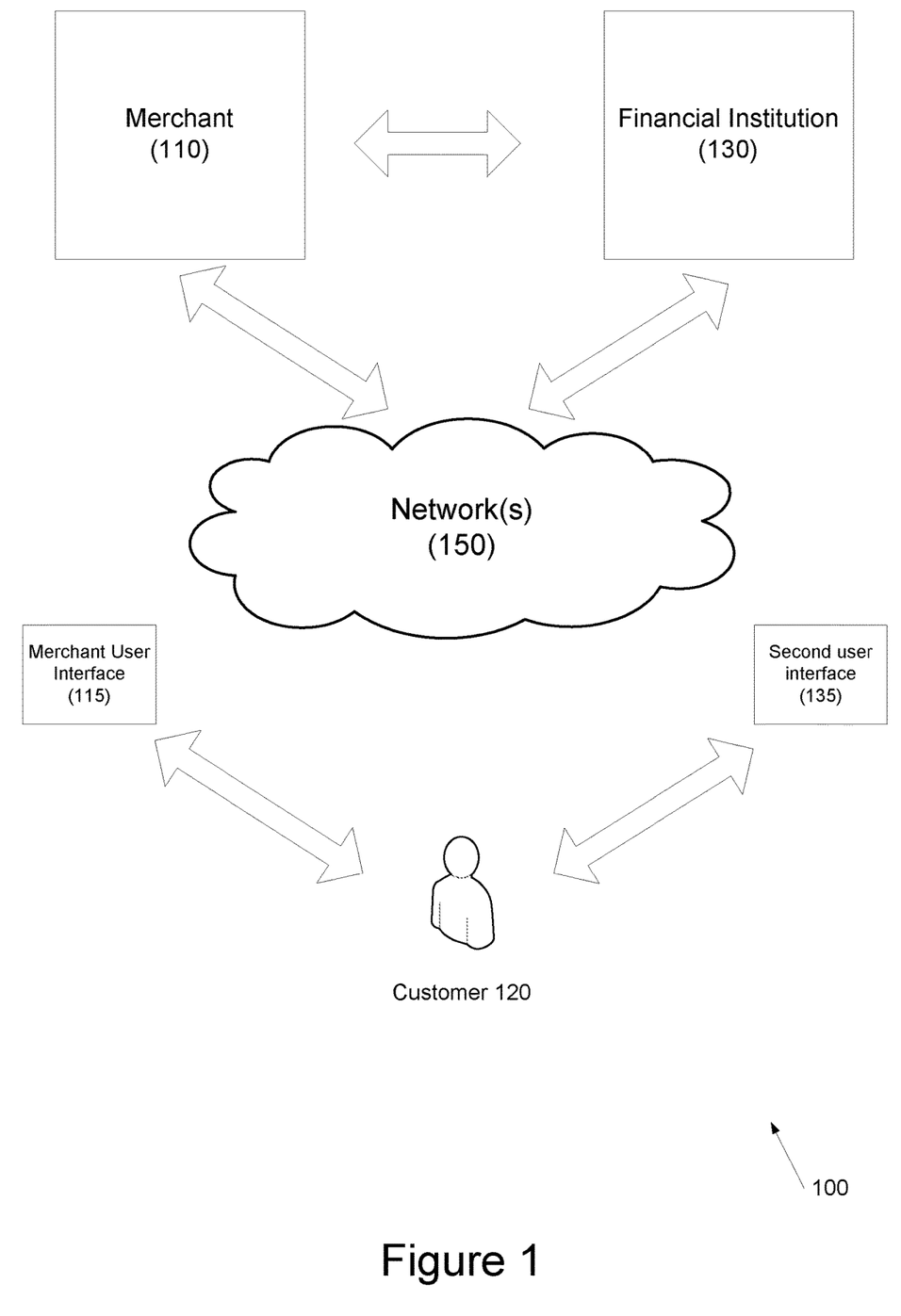
FIG. 1 depicts a system for facilitating online payment according to one embodiment.

Referring to FIG. 1, an exemplary system for facilitating online payments is disclosed. In one embodiment, system 100 may include merchant 110, financial institution 130, and customer 120. Merchant 110 and financial institution 130 may each have their own respective consumer-facing interfaces 115 and 135 for interaction with customer 120. In one embodiment, consumer-facing interfaces 115 and 135 may be websites, mobile device websites, point of sale (POS) devices, applications (e.g., merchant applications, applications providing in-application purchases), etc. Other consumer-facing interfaces (not shown) may be used as necessary and/or desired.

In one embodiment, any of merchant 110, financial institution 130, and customer 120 may communicate using at least one network 150. Network 150 may be any suitable network, including the Internet, payment networks (e.g., Visa, MasterCard, American Express, private label, closed loop/over-the-top, bank networks, ACH, etc.). Other networks, including communication networks, payment networks, combinations thereof, etc. may be used as is necessary and/or desired.

In one embodiment, customer 120 may be provided with one or more payment device. The payment device may include credit cards, debit cards, rewards points, loyalty points, etc. as well as access points to non-payment accounts for payment (e.g., lines of credit, such as a HELOC, mortgages, etc.), applications for secured and unsecured credit, etc. In one embodiment, any or all of these payment devices may be accessed using an electronic wallet (e.g., a mobile wallet on an electronic device), a physical device (e.g., physical cards, physical tokens, etc.), etc.

In one embodiment, the payment device and/or account may be represented with a token. The token may be provisioned by financial institution 130. Network 150 may receive the token from the merchant and may route it to financial institution 130, which may then determine the account with which the token is associated.

Figure 2:
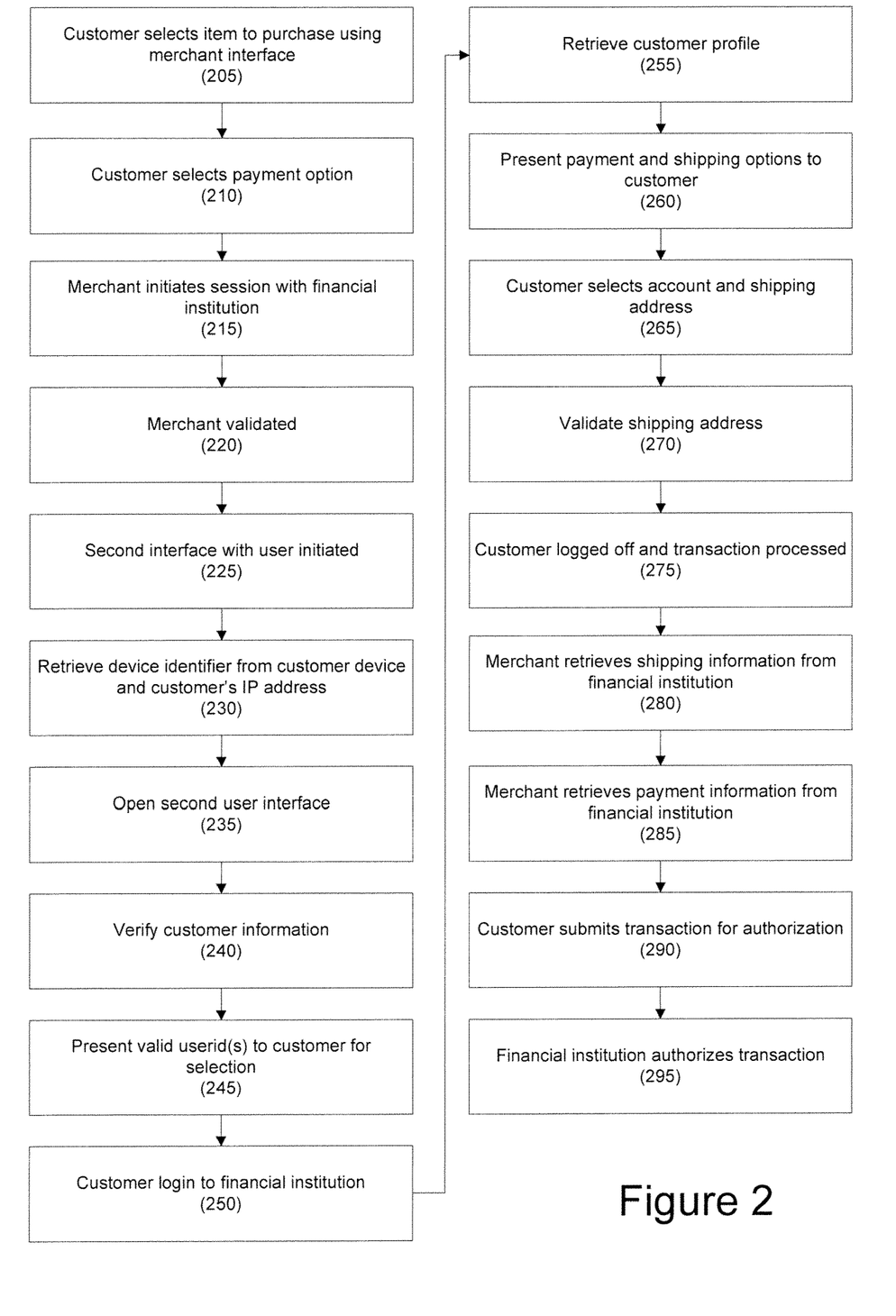
FIG. 2 depicts a method for facilitating online payment according to one embodiment.

Referring to FIG. 2, an exemplary method for facilitating online payments is disclosed.

In step 205, a customer may browse a merchant's ecommerce site and may identify a good or service to purchase. For example, using the merchant's user interface, the customer may select the good or service and place it in an electronic "shopping cart."

In step 210, the customer may select a direct payment option involving a financial institution with which the customer has an account. In one embodiment, this may involve the customer selecting an option on the merchant's checkout page.

In step 215, the merchant may initiate a session with the financial institution. In one embodiment, the merchant may pass certain information to the financial institution, such as, a merchant identifier, the customer's IP address, a merchant userid, a merchant password, and a cart identifier for the electronic shopping cart. In one embodiment, the merchant userid and merchant password may be established when the merchant establishes an account with the financial institution.

In step 220, the financial institution validates the merchant. In one embodiment, this may involving checking that the merchant is registered with the financial institution. If the merchant is registered, a session may be established, and a session identifier, such as a session token, may be passed from the financial institution to the merchant's user interface. Any suitable identifier for the session may be used as necessary and/or desired.

In one embodiment, a timer may be set for the session identifier. At the conclusion of the time period, the session identifier may be expired.

In step 225, a second user interface may be initiated. In one embodiment, the second user interface may be a JavaScript Light box. In another embodiment, the second user interface may be a second window. In another embodiment, an in-application payment window may be used.

In one embodiment, the second user interface may be initiated using the merchant session identifier and a callback.

In step 230, a device identifier, such as a cookie, may be retrieved from the customer's device. In one embodiment, the device identifier may be placed on the customer's device during a session with the financial institution. For example, during device registration and/or during online access, the financial institution may store a cookie that identifies the device, browser, etc. If the device identifier does not exist, the customer may be directed to the financial institution's site, application, etc. in order to establish the device identifier. This may be done in a separate window, in a light box, etc.

In another embodiment, out-of-band authentication may be used to validate the device. Any other methods may be used as necessary and/or desired.

In another embodiment, more than one userid may be associated with a device identifier.

In addition, the customer's IP address may be retrieved.

In step 235, the second user interface may be opened using the merchant session identifier, the client IP address, and the device identifier.

In step 240, the customer may be validated. This may include comparing the customer IP address provided by the merchant's user interface to the customer IP address received by the second user interface.

In another embodiment, customer userids that are associated with the device identifier may be retrieved, along with any additional information such as a passphrase or similar security feature.

In step 245, the userids that are associated with the device identifier, as well as the associated passphrases, graphics, etc. may be displayed for the customer. In one embodiment, a drop-down box of userids may be presented for the customer to select from. In one embodiment, the customer may then enter the customer's password.

In one embodiment, if there are no userids to present to the customer, the customer may be prompted to enter a userid and a password. In another embodiment, the customer may be redirected to the financial institution's website, application, etc. in a separate window, light box, application, etc.

In step 250, the customer's credentials (e.g., userid, password, etc.) may be verified and the customer may be logged in to the financial institution. In one embodiment, the customer's credentials with the financial institution may be used (i.e., wallet-specific credentials are not needed).

In step 255, the customer's profile may be retrieved. In one embodiment, this may involve retrieving the customer's accounts with the financial institution (e.g., credit cards, debit card, checking account, etc.), shipping addresses, account balances, etc. These accounts may, for example, be part of the customer's electronic wallet. In another embodiment, the customer's preferred account and preferred shipping address may also be retrieved.

In one embodiment, only valid payment accounts with the financial institution are retrieved.

In step 260, payment and/or shipping options may be presented to the customer. In one embodiment, additional information, such as account balances, rewards available, rewards to be earned, discounts, offers, etc. may be presented as necessary and/or desired.

In one embodiment, the customer's billing address, ship to address, account name (if assigned), email address, etc. may be presented to the customer.

In one embodiment, the customer's preferred (or default) payment and/or shipping addresses may be presented first.

In step 265, the customer may select an account and shipping address. In one embodiment, the customer may enter a new shipping address if desired.

In step 270, the shipping address may be validated. In one embodiment, fraud checking based on the name and shipping address may be performed. In one embodiment, the address may be checked against the customer's billing address, mortgage address, or address associated with any other accounts with the financial institution. If the address is not one of those addresses, the address may be validated against a blacklist of known fraudulent addresses. Other fraud checking may be used as necessary and/or desired.

In one embodiment, the address may be validated against a commercial database of postal addresses to detect typographical errors.

In one embodiment, a suspicious address may be verified by contacting the customer via another communication channel, on a second registered device, etc.

In step 275, the customer may be logged off from the financial institution, and the transaction may be authorized.

In step 280, the merchant user interface may retrieve the customer shipping address from the financial institution. In one embodiment, the merchant user interface may provide certain information to the financial institution, such as the shipping request, the merchant session identifier, the client IP address, the merchant identifier, the merchant userid, the merchant password, and the card identifier for the electronic shopping cart. In one embodiment, an application programming interface, or API, may be used to make this request.

In another embodiment, the financial institution may push shipping information to the merchant user interface.

In step 285, the merchant user interface may retrieve payment information for the transaction from the financial institution. In one embodiment, the payment information may represent the partial payment information, such as the last four digits of the credit card number, an account nickname, etc. This may be so that masked payment information may be presented to the customer during the confirmation stage or any other stage as necessary and/or desired. In another embodiment, the full payment information (e.g., full credit card number) may be provided to the merchant. In still another embodiment, tokenized payment information may be provided.

In step 290, the customer may authorize the transaction by selecting "confirm" or "submit", and, in step 295, the financial institution may authorize the transaction. In one embodiment, after authorization, the financial institution may inform the merchant user interface that the transaction is authorized.

Figure 3:
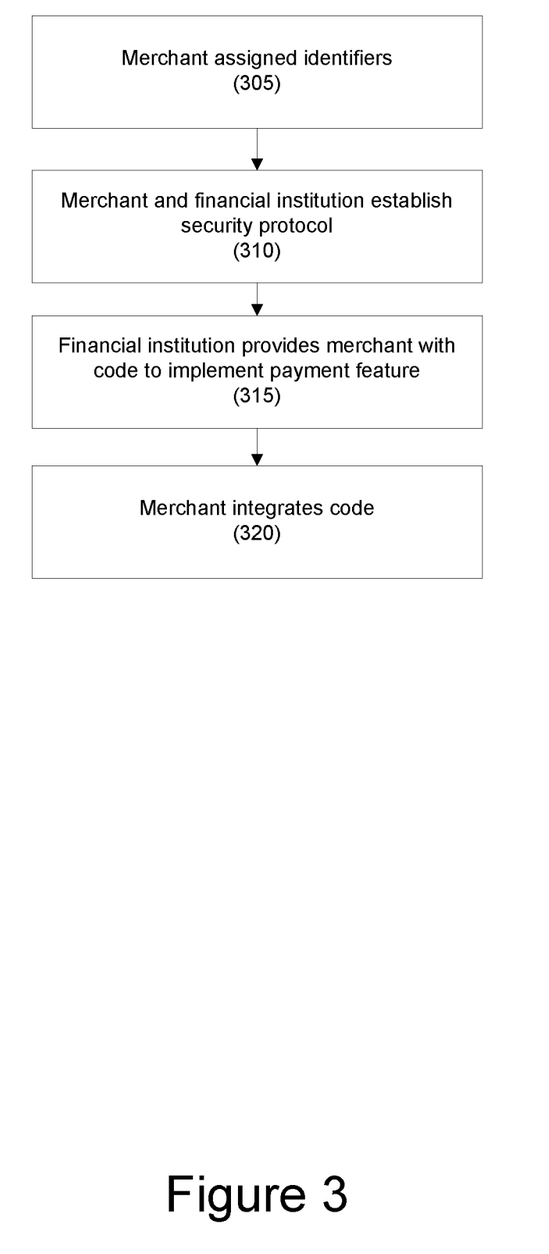
FIG. 3 depicts a method for enrolling a merchant according to one embodiment.

Referring to FIG. 3, a method for merchant integration is disclosed. In step 305, a merchant may be assigned a merchant identifier, a merchant userid, and a password. In one embodiment, the merchant id and the merchant userid are both assigned, as the merchant userid is used for electronic access to the financial institution. One or both may be used as necessary and/or desired.

In step 310, the merchant and the financial institution may establish a security protocol. In one embodiment, the merchant and financial institution may exchange keys (e.g., public/private keys). In one embodiment, time limits for sessions may be established.

In step 315, the financial institution may provide the merchant with code to implement a financial institution payment option to the merchant's checkout page, as well as any other code that may be necessary to implement this functionality. For example, one or more application programing interfaces (APIs) may be provided for the merchant to retrieve certain information from the financial institution. Example APIs include, for example, initial handshake/authentication of the merchant, receiving the default shipping address, receiving an updated shipping address and page refresh requests, receiving payment information, etc.

In step 320, the merchant may integrate some or all of the code into its website. For example, the merchant may implement the code in its merchant user interface.

Figure 4:
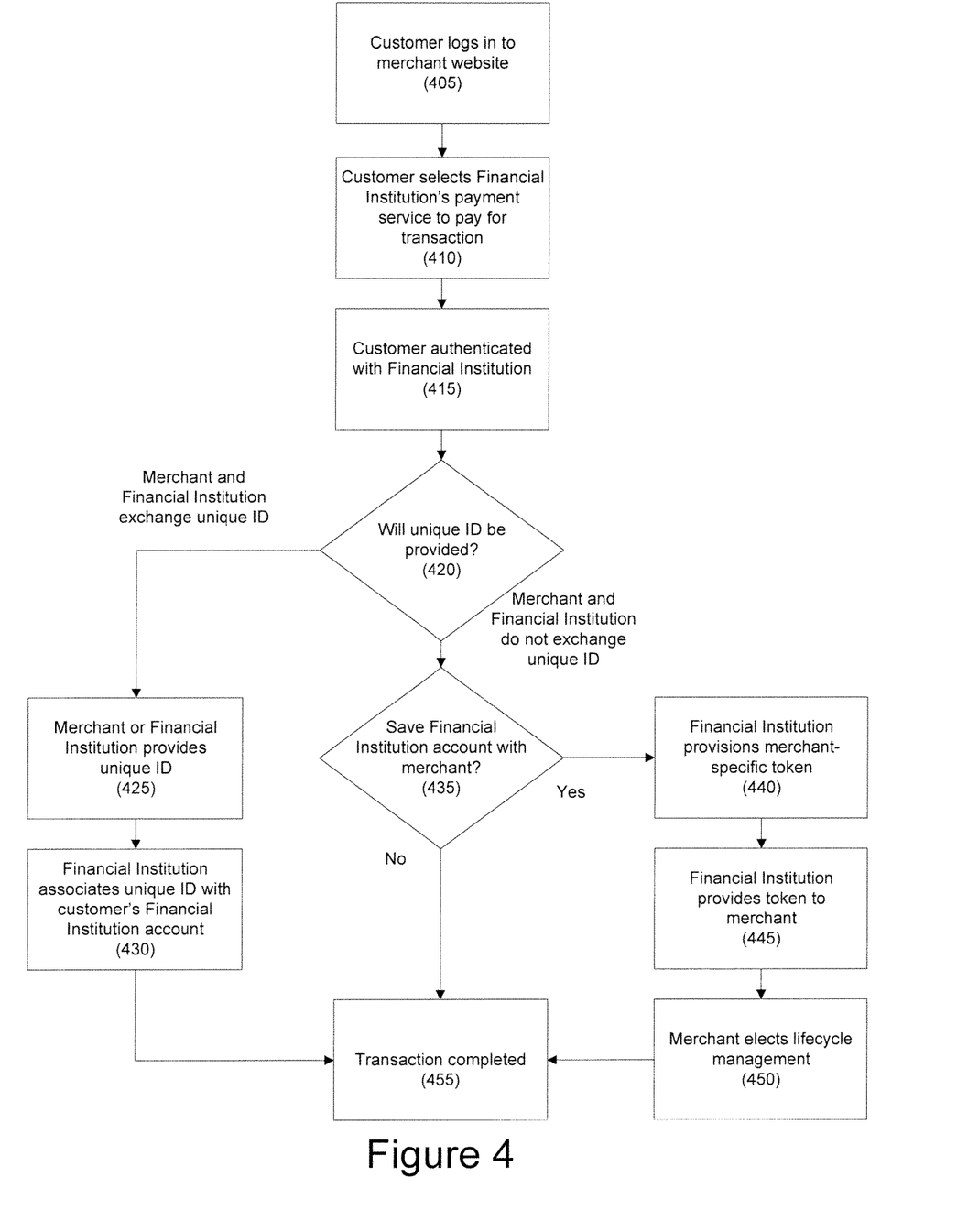
FIG. 4 depicts a method for facilitating online payment according to one embodiment.

Referring to FIG. 4, a method of conducting a transaction using a financial institution's payment service is provided according to one embodiment. In this embodiment, the customer is registered with the merchant (e.g., the customer has an account with the merchant).

In step 405, a customer logs in to a merchant's website and selects a good and/or a service to purchase, or conducts some other type of transaction.

In step 410, the customer chooses to pay for the good and/or service using the financial institution's payment service. In one embodiment, the customer may select this on a check-out page, a shopping cart page, in a separate window, in a light box, etc.

In step 415, the customer may be authenticated with the financial institution. In one embodiment, this may be in a pop-up window, a light box, a separate window, etc.

In step 420, after the customer is authenticated, the merchant may either (1) exchange a unique identifier with the financial institution (e.g., permitting the customer to associate its merchant account with a financial institution account), or (2) not exchange a unique identifier with the financial institution but still save the account with the merchant (e.g., save it for account on file transactions).

If the merchant provides the financial institution with the unique identifier, in step 425, the merchant may send a unique identifier to the financial institution. In one embodiment, the merchant may provide this unique identifier when sending transaction information to the financial institution.

In one embodiment, the merchant may request that the financial institution provide the merchant with a unique identifier.

The unique identifier may be any identifier that the merchant may use to identify a customer. For example, the unique identifier may be a loyalty identifier, an email address, a phone number, a customer number, etc. Any suitable unique identifier may be used as is necessary and/or desired.

In step 430, the financial institution may associate or link the unique identifier to the customer's account with the financial institution. In one embodiment, this may involve storing the unique identifier in a look-up table, linking the unique identifier to the customer's financial institution account, etc.

If the merchant does not provide the financial institution with a unique identifier, in step 435, the merchant and/or the customer may decide whether or not to save the customer's financial institution account with the merchant.

If the merchant or customer selects the option to save the account with the merchant, in step 440, the financial institution may provision a merchant-specific identifier (e.g., a token) for the merchant, and in step 445, the financial institution may provide this token to the merchant. In one embodiment, the token may be limited to one or more device, to a particular time frame, geographical area, etc. In one embodiment, any suitable restriction may be placed on the use of the token as is necessary and/or desired.

In one embodiment, the financial institution may provide certain information to the merchant. For example, the financial institution may provide the customer's billing address so it can be checked against a shipping address or in case a shipping address has not been provided. The amount of information that is provided may be based on customer preferences, the financial institution's policies (e.g., do not provision a token or provide information to an unknown merchant, foreign merchant, etc.), etc.

In step 450, the merchant may select, as a merchant preference, token lifecycle management. For example, when a token is updated, the financial institution may automatically send an updated token to the merchant. In one embodiment, the financial institution may push a replacement token to the merchant whenever there is a change. Other merchant preferences may be set as necessary and/or desired.

In one embodiment, the customer may also elect to have its stored tokens automatically updated, or it may disable this feature.

In step 455, the transaction may be completed using the financial institution's payment service.

Figure 5:
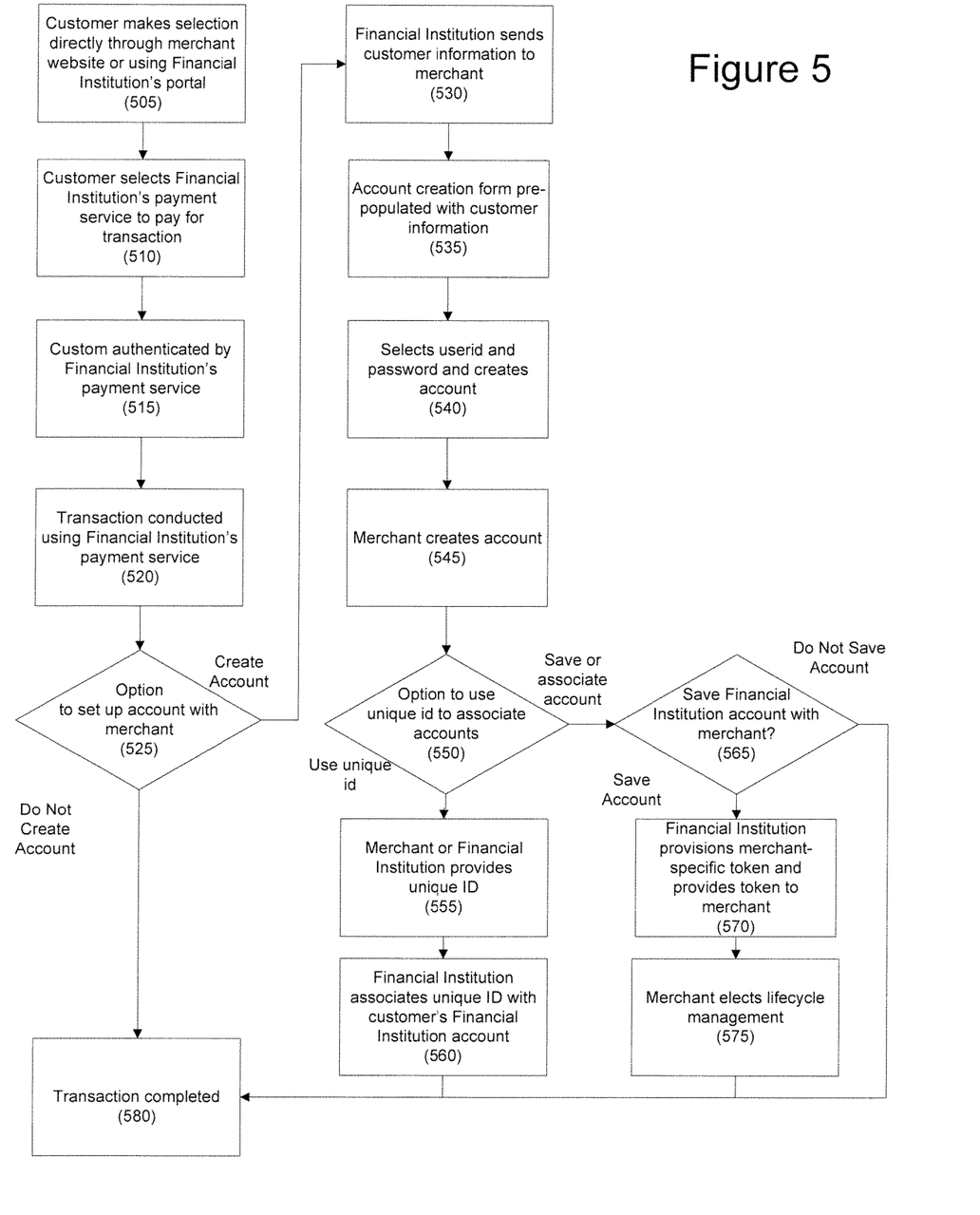
FIG. 5 depicts a method for facilitating online payment according to one embodiment.

Referring to FIG. 5, a method of conducting a transaction using a financial institution's payment service according to one embodiment is provided. Unlike the method depicted in FIG. 4, the customer is not a registered customer with the merchant (i.e., the customer does not have an account) with the merchant.

In step 505, a customer accesses a merchant's website and selects a good and/or service to purchase.

In step 510, the customer selects the financial institution's payment service to pay for the transaction. In one embodiment, this selection may be made from a checkout screen, a shopping cart, etc.

In step 515, the customer may be authenticated by the financial institution. In one embodiment, the customer may be presented with a light box, a separate window, etc. in which to enter authenticating information for the financial institution.

In step 520, the transaction may be conducted using the financial institution's payment service.

In step 525, the customer and/or merchant may have the option of becoming a registered customer with the merchant (i.e., creating a customer account with the merchant). In one embodiment, this option may be presented by the financial institution. If the customer and/or merchant wish to create an account, in step 530, the financial institution may provide customer information, such as the customer's name, address, email address, phone number, etc.

In one embodiment, the amount and type of information that is provided to the merchant may be based on customer preferences, policies of the financial institution, etc.

In one embodiment, the customer information may be sent to the merchant as text. In another embodiment, the customer information may be sent in an account creation form. In one embodiment, the merchant may coordinate with the financial institution to specify fields, provide a preferred form, etc.

In step 535, if the financial institution did not provide an account creation form, the data provided by the financial institution may be used to pre-populate the fields of the merchant's account creation form.

In step 540, the customer may select a userid, password, and any other information that is necessary to create an account. The customer may also update or change any information provided by the financial institution.

In one embodiment, the merchant may receive the customer's userid from the financial institution and set that userid as the default userid with the merchant.

In one embodiment, certain fields may be locked, such as the customer address. This may be, for example, for fraud purposes. In one embodiment, to update these fields, the customer may be required to update this information with the financial institution.

In step 545, the merchant may create a customer account.

In step 550, the merchant may have an option to provide the financial institution with a unique identifier for the customer, or to receive a unique identifier for the customer in order to associate the customer's merchant account with the financial intuition's account. If the unique identifier is used, in step 555, the merchant or financial institution provides the other with a unique identifier, and in step 560, the financial institution associates the unique identifier with the customer's financial institution account.

If the unique identifier is not used, in step 565, the customer or the merchant may elects the option to save the account with the merchant, in step 570, the financial institution may provision a merchant-specific identifier (e.g., a token) for the merchant, and may provide this token to the merchant. In one embodiment, the token may be limited to one or more device, to a particular time frame, geographical area, etc. In one embodiment, any suitable restriction may be placed on the use of the token as is necessary and/or desired.

In step 575, the merchant may select token lifecycle management. For example, when a token is updated, the financial institution may automatically send an updated token to the merchant.

In step 580, the transaction is complete.

In one embodiment, the customer may not need to select an item to purchase; instead, the user may authenticate with the financial institution and select an option to create an account as discussed above independent of a purchase.

In the exemplary methods depicted in FIGS. 4 and 5, it should be recognized that the customer may authenticate with the financial institution at any time. For example, the customer may authenticate with the financial institution before the customer shops. In another embodiment, the customer may authenticate with the financial institution during checkout.

Figure 6:
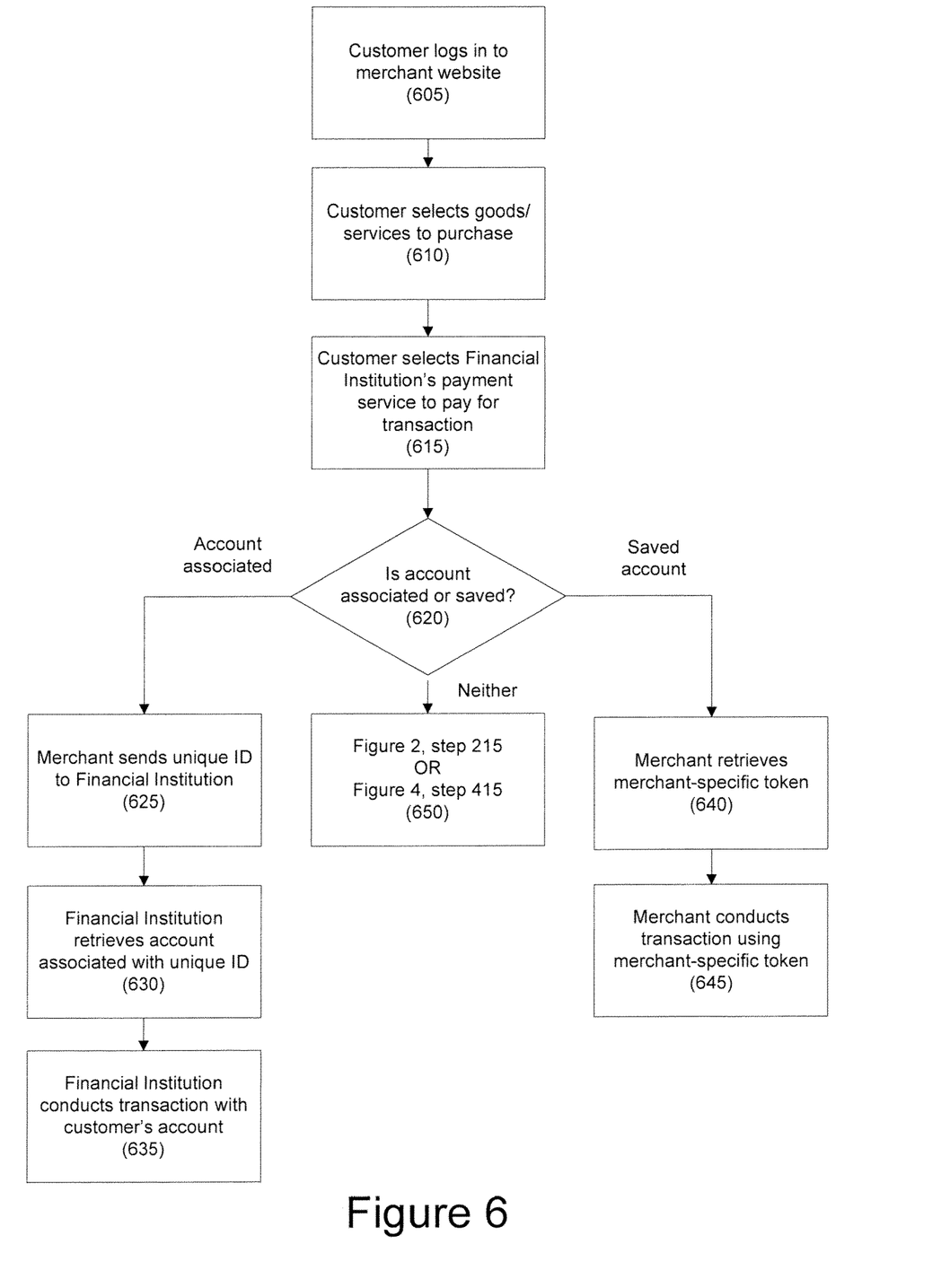
FIG. 6 depicts a method for facilitating online payment according to one embodiment.

Referring to FIG. 6, a method of conducting a transaction is disclosed according to one embodiment. In step 605, a customer may log in to a merchant website using the customer's credentials with the merchant.

In step 610, the customer may select a good and/or service to purchase, or some other transaction to conduct.

In step 615, the customer selects the financial institution's payment service to pay for the transaction.

In step 620, the merchant may determine whether the customer has an account associated or saved with the merchant.

If there is an associated account, in step 625 the merchant may send the customer's unique identifier to the financial institution. In one embodiment, the financial institution may authenticate the user.

In step 630, the financial institution may retrieve the account associated with the unique identifier, and in step 635, the transaction may be conducted using the customer's account.

If there is a saved account, in step 640, the merchant may retrieve the customer's merchant-specific token, and in step 645, may conduct the transaction using the merchant-specific token.

If there is no account associated or saved, in step 650, the process may continue at either FIG. 2, step 215 ("Merchant initiates session with financial institution") or FIG. 4, step 415 ("Customer authenticated with Financial Institution").

Figure 7:
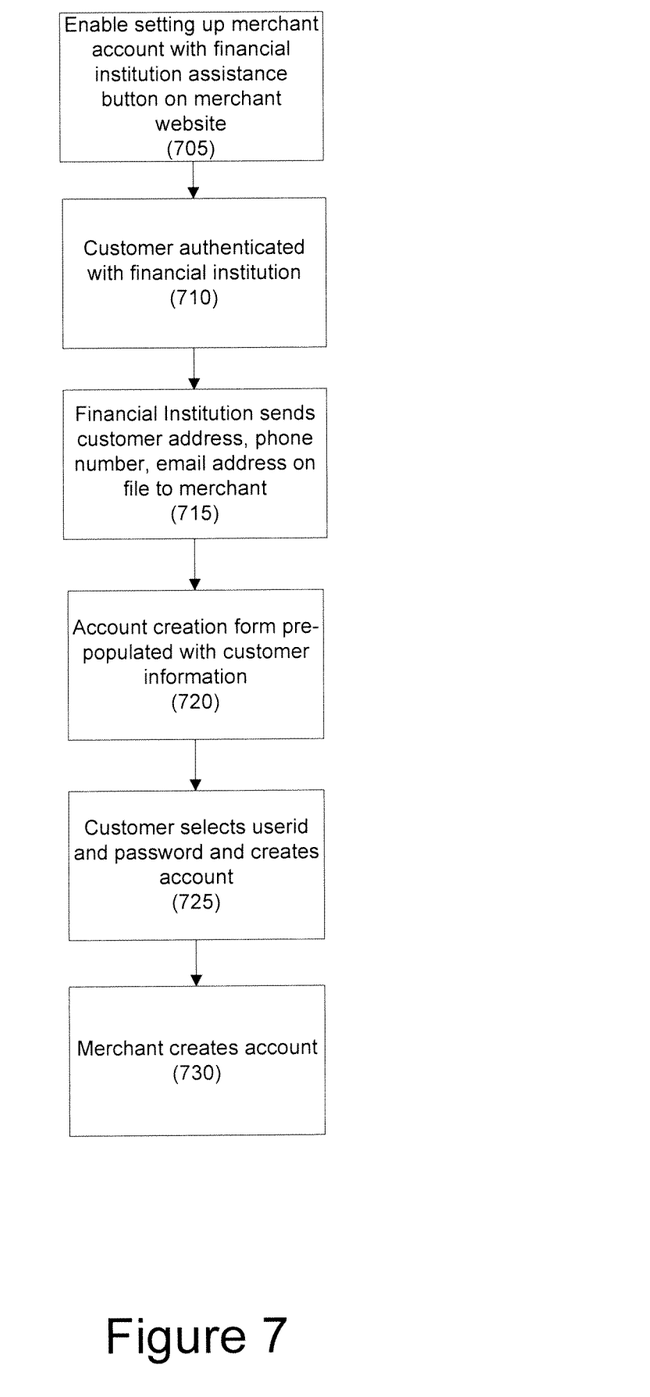
FIG. 7 depicts a method for creating a merchant account according to one embodiment.

Referring to FIG. 7, a method for creating a merchant account is provided according to one embodiment. In step 705, the merchant website may be provided with an option to set up a merchant account with assistance from the financial institution. In one embodiment, this option may be provided as a button or similar interface.

In step 710, if the customer has not already been authenticated with the financial institution, the customer is so authenticated.

In step 715, the, the financial institution may provide customer information, such as the customer's name, address, email address, phone number, etc. In one embodiment, the type and amount of data that may be provided may be based on customer preferences, merchant policies, etc.

In one embodiment, the customer information may be sent as text. In another embodiment, the customer information may be sent in an account creation form. In one embodiment, the merchant may coordinate with the financial institution to specify fields, provide a preferred form, etc.

In step 720, if the financial institution did not provide a form, the data provided by the financial institution may be used to pre-populate the fields of the merchant's account creation form.

In step 725, the customer may select a userid, password, and any other information necessary to create an account. The customer may also update or change any information provided by the financial institution.

In one embodiment, certain fields may be locked, such as the customer address, for fraud purposes. In one embodiment, to update these fields, the customer may be required to update this information with the financial institution.

In step 730, the merchant may create a customer account.

Although several embodiments have been disclosed, it should be recognized that the embodiments are not necessarily exclusive.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for facilitating a transaction, comprising:
   at a financial institution comprising an information processing device comprising at least one computer processor:
   establishing an online session with a merchant involved in an online transaction with a customer in a first interface;
   validating the merchant as a registered merchant;
   providing the merchant with a session identifier for the online session that uniquely identifies online session between the financial institution and the merchant;

providing the merchant with a financial institution logon page for the customer in a second interface, the second interface associated with the session identifier, wherein the second interface comprises a lightbox;

receiving financial institution logon information for the customer from the second interface;

validating the financial institution customer logon information;

receiving a selection of a payment account and a shipping address for the online transaction from the second interface;

providing the merchant with a token for the payment account in the first interface;

receiving a payment request from the merchant, the payment request comprising the token and the session identifier; and approving the payment request.

2. The method of claim 1, wherein the session identifier comprises a session token.

3. The method of claim 1, wherein the second interface comprises a separate browser window.

4. The method of claim 1, wherein the logon page is pre-populated with a customer identifier.

5. The method of claim 1, wherein the session identifier is received with the logon information from the customer.

6. The method of claim 1, wherein a device identifier is received prior to providing the logon page.

7. The method of claim 6, wherein at least one customer identifier to present to the customer on the logon page is identified based on the device identifier.

8. The method of claim 1, wherein the merchant receives an IP address of the customer.

9. The method of claim 1, further comprising:
presenting a plurality of payment accounts in an electronic wallet for the user as payment options.

10. The method of claim 9, wherein one of the plurality of accounts in the electronic wallet is preselected.

11. The method of claim 1, wherein the account is a non-payment account.

12. The method of claim 11, wherein the non-payment account is one of a line of credit, a mortgage, and a rewards point account.

13. The method of claim 1, wherein the account comprises an application for an account.

14. The method of claim 1, further comprising associating the session identifier with the online transaction.

15. The method of claim 1, further comprising:
identifying the payment account using the token and the session identifier received from the merchant.

16. A method for facilitating a transaction, comprising:
at a financial institution comprising an information processing device comprising at least one computer processor:
authenticating a customer that has selected a good or service to purchase from a merchant;
establishing an online session with the merchant in a first interface and providing the merchant with a session identifier for the online session that uniquely identifies the online session between the financial institution and the merchant;
providing the merchant with a financial institution logon page for the customer in a second interface, the second interface associated with the session identifier, wherein the second interface comprises a lightbox;
receiving financial institution logon information from the customer in the online session from the second interface;
validating the financial institution customer logon information;
receiving a selection of a payment account for conducting the transaction and the session identifier from the second interface;
provisioning a merchant-specific payment token for the payment account; and
providing the merchant-specific payment token to the merchant in the first interface;
wherein the merchant-specific payment token can only be used with the merchant;
wherein the merchant stores the merchant-specific token for a future transaction with the customer.

17. The method of claim 16, wherein the session identifier comprises a session token.

18. The method of claim 16, wherein the second interface comprises a separate browser window.

* * * * *